United States Patent [19]

Carver et al.

[11] Patent Number: 5,756,569

[45] Date of Patent: May 26, 1998

[54] USE OF ALKYL 3-ALKOXYPROPIONATES AS COALESCING AGENTS IN AQUEOUS COATING COMPOSITIONS

[76] Inventors: Bobby Carroll Carver, 516 Woodmere Dr.; Glenn Clark Jones, 3620 Hemlock Park Dr., both of Kingsport, Tenn. 37663; Ronald Keith Litton, 4321 Rock Rose Cir.; William Dell Nottingham, 4700 Lake Park Dr., both of Kingsport, Tenn. 37664; Alan Kent Wilson, 518 Summerville Rd., Kingsport, Tenn. 37663

[21] Appl. No.: 770,762

[22] Filed: Dec. 19, 1996

Related U.S. Application Data

[60] Provisional application No. 60/012,645, Mar. 1, 1996.

[51] Int. Cl.$^6$ .................................................... C08K 5/10
[52] U.S. Cl. .................. 524/317; 524/287; 524/290; 524/292
[58] Field of Search ............................. 524/287, 290, 524/292, 308, 317

[56] References Cited

U.S. PATENT DOCUMENTS

| | | | |
|---|---|---|---|
| 2,870,195 | 1/1959 | Heininger et al. | 524/317 |
| 3,399,158 | 8/1968 | Hultson | 260/29.6 |
| 3,580,876 | 5/1971 | Stone et al. | 524/317 |
| 3,746,679 | 7/1973 | Seipel, Jr. | 524/317 |
| 4,265,797 | 5/1981 | Suk | 260/29.6 |
| 4,455,402 | 6/1984 | Amick et al. | 524/317 |
| 4,489,188 | 12/1984 | Jones et al. | 524/292 |
| 4,698,377 | 10/1987 | Laitar | 523/143 |
| 4,785,133 | 11/1988 | Raynolds et al. | 560/187 |
| 4,827,021 | 5/1989 | Jones et al. | 560/187 |
| 4,899,969 | 2/1990 | Bauer et al. | 248/161 |
| 5,066,522 | 11/1991 | Cole et al. | 427/422 |
| 5,358,789 | 10/1994 | Kuo et al. | 428/482 |
| 5,506,328 | 4/1996 | Chandalia et al. | 528/49 |

*Primary Examiner*—Judy M. Reddick
*Attorney, Agent, or Firm*—Betty J. Boshears; Harry J. Gwinnell

[57] ABSTRACT

This invention relates to an aqueous coating composition comprising a stable dispersion of resin particles and a coalescing agent wherein the coalescing agent is an alkyl 3-alkoxypropionate having the structure:

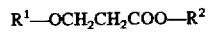

$$R^1\text{—OCH}_2\text{CH}_2\text{COO—}R^2$$

wherein $R^1$ and $R^2$ are independently selected from the group consisting of an alkyl and a arylalkyl group wherein the sum of the carbon atoms of the alkyl and arylalkyl groups is 5 to 10, provided that $R^2$ is not methyl.

16 Claims, No Drawings

USE OF ALKYL 3-ALKOXYPROPIONATES AS COALESCING AGENTS IN AQUEOUS COATING COMPOSITIONS

This is an ORIGINAL application based on the PROVISIONAL Ser. No. 60/012,645 filed Mar. 1, 1996.

FIELD OF THE INVENTION

This invention relates to an aqueous coating composition comprising a stable dispersion of resin particles and a coalescing agent wherein the coalescing agent is an alkyl 3-alkoxypropionate.

BACKGROUND OF THE INVENTION

The film properties of aqueous coatings are influenced by the coalescing agent within the composition. The purpose of the coalescing agent is to solvate the particles of a dispersion after the water and solvent have evaporated in order to yield a homogeneous, continuous film.

U.S. Pat. No. 4,265,797 describes lower monoalkyl ethers of ethylene or propylene glycol, such as propylene glycol methyl ether, as coalescing solvents. U.S. Pat. No. 3,399,158 describes diesters of aliphatic $C_2$-$C_6$ dicarboxylic acids such as dimethyl succinate, diethyl succinate, and diisopropyl succinate, as coalescing agents for copolymer emulsion paints.

U.S. Pat. No. 4,489,188 describes aqueous coating compositions containing ether-esters as coalescing agents. The ether-esters of U.S. Pat. No. 4,489,188 are of the following formulas (I) or (II):

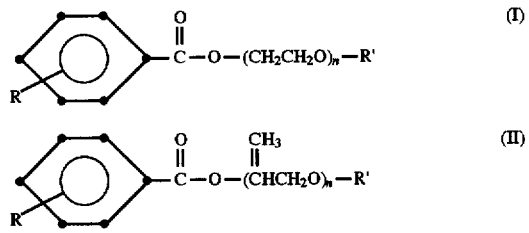

Other coalescing agents include ethylene glycol monobutyl ether acetates, diethylene glycol monoethyl ether, and 2,2,4-trimethylpentanediol-1,3-monoisobutyrate (TMPIB).

Disadvantages associated with the above-mentioned coalescing agents are that they evaporate too slowly, are inefficient at reducing minimum film forming temperature, emit an objectionable odor, or exhibit poor hydrolytic stability.

SUMMARY OF THE INVENTION

Accordingly, it is an object of this invention to provide a coalescing agent for an aqueous coating composition.

It is another object of this invention to provide a coalescing agent for aqueous coating compositions which reduces the minimum film forming temperature of the coating composition.

It is also an object of this invention to provide a coalescing agent for aqueous coating compositions which have good hydrolytic stability in the coating composition.

With regard to the foregoing and other objects, the present invention provides an aqueous coating composition comprising a stable dispersion of resin particles and a coalescing agent wherein the coalescing agent is an alkyl 3-alkoxypropionate having the structure:

$$R^1\text{—OCH}_2\text{CH}_2\text{COO—}R^2$$

wherein $R^1$ and $R^2$ are independently selected from the group consisting of an alkyl and a arylalkyl group wherein the sum of the carbon atoms of the alkyl and arylalkyl groups is 5 to 10, provided that $R^2$ is not methyl.

The alkyl 3-alkoxypropionates of this invention display higher Relative Coalescing Efficiency values as coalescing agents than 2,2,4-trimethylpentanediol-1,3-monoisobutyrate (TMPIB) which is a widely used coalescing agent. Moreover, the alkyl 3-alkoxypropionates have a faster evaporation rate than TMPIB which allows films prepared from the aqueous coating compositions of the present invention to dry quicker.

DETAILED DESCRIPTION OF THE INVENTION

The invention relates to an aqueous coating composition comprising a stable dispersion of resin particles and a coalescing agent. The coalescing agent is an alkyl 3-alkoxypropionate having the structure:

$$R^1\text{—OCH}_2\text{CH}_2\text{COO—}R^2$$

In the above formula, $R^1$ and $R^2$ are independently selected from an alkyl or a arylalkyl group provided that $R^2$ is not methyl. The sum of the carbon atoms of the alkyl and arylalkyl groups is 5 to 10. It has been determined that if $R^2$ is methyl, the hydrolytic stability of the resin emulsion is unacceptable.

Examples of suitable $R^1$ groups include methyl, ethyl, propyl, butyl, isobutyl, 2-methylpentyl, 2-ethylhexyl and benzyl. Examples of suitable $R^2$ groups include ethyl, propyl, butyl, isobutyl, 2-methylpentyl, 2-ethylhexyl and benzyl. Any combination of $R^1$ and $R^2$ groups may be used. Specific examples of preferred alkyl 3-alkoxypropionates include propyl 3-propoxypropionate, butyl 3-butoxypropionate, isobutyl 3-isobutoxypropionate, butyl 3-ethoxypropionate, isobutyl 3-ethoxypropionate, and 2-ethylhexyl 3-ethoxypropionate. Most preferably the alkyl 3-alkoxypropionate is butyl 3-ethoxypropionate, butyl 3-butoxypropionate, or isobutyl 3-isobutoxypropionate.

The alkyl 3-alkoxypropionates described above may be prepared by any method known in the art. For example, the alkyl 3-alkoxypropionates can be prepared by reacting a dialkoxymethane with ketene, base catalyzed addition of alcohols to alkyl acrylates, transesterification of alkyl 3-alkoxypropionates and from acrylonitrile or its derivatives. U.S. Pat. Nos. 4,785,133, 4,827,021 and 4,898,969 are hereby incorporated by reference for their disclosure of methods to prepare alkyl 3-alkoxypropionates.

The aqueous coating composition of the present invention comprises a stable dispersion of resin particles. The resin is a stable colloidal dispersion of a thermoplastic or thermosetting organic addition polymer in an aqueous emulsion. The resin preferably has a glass transition temperature (Tg) that is greater than room temperature. Examples of thermoplastic polymers include acrylonitrile-butadiene-styrene, polyvinyl chloride, polyamide, cellulose acetate, acrylic and polystyrene. More than one thermoplastic or thermosetting polymer may be used to prepare the aqueous coating compositions. Suitable catalysts, emulsifiers, surfactants, and processes for making such resins are well known in the art.

In a preferred embodiment of the present invention, the resin is prepared from an acrylic polymer, a styrene-acrylic polymer or a vinyl acetate-acrylic copolymer. For example, the resin may be prepared from a polymer or copolymer of acrylic acid, methacrylic acid, esters of acrylic acid or methacrylic acid, or acrylonitrile. Examples of acrylate esters include methyl acrylate, ethyl acrylate, butyl acrylate, hexyl acrylate, isooctyl acrylate, isodecyl acrylate, lauryl acrylate, stearyl acrylate, phenoxyethyl acrylate, methoxyethyl acrylate, benzyl acrylate, furyl acrylate, methylfuryl acrylate, butylfuryl acrylate, tetrahydrofurfuryl acrylate, ethoxyethyl acrylate, 2-ethylhexyl acrylate, cyclopentyl acrylate, cyclohexyl acrylate, isobornyl acrylate, hydroxyethyl acrylate, and hydroxypropyl acrylate.

Examples of methacrylate esters include methyl methacrylate, ethyl methacrylate, propyl methacrylate, butyl methacrylate, hexyl methacrylate, cyclohexyl methacrylate, isodocyl methacrylate, lauryl methacrylate, stearyl methacrylate, isobornyl methacrylate, phenyl methacrylate, benzyl methacrylate, propylene glycol methacrylate, tetrahydrofurfuryl methacrylate, hydroxylethyl methacrylate, and hydroxypropyl methacrylate.

Preferably, from about 20 to about 80 weight percent of one or more of the above monomers are copolymerized with from about 80 to about 20 weight percent of a hardening monomer such as methyl methacrylate, 2-ethoxyethyl methacrylate, styrene, or acrylonitrile and from about 0.1 to about 5 weight percent of a polymerizable acid such as acrylic acid or methacrylic acid.

Especially preferred resins include RHOPLEX AC-390 which is prepared from butyl acrylate, 2-ethylhexyl acrylate and methyl methacrylate, and is available from Rohm and Haas; RHOPLEX HG-74 which is prepared from a styrene-acrylic polymer that contains 15–20% styrene, and is available from Rohm and Haas; RHOPLEX WL-91 which is prepared from a styrene-acrylic polymer that contains 15–20% styrene, and is available from Rohm and Haas; FLEXBOND 325 which is prepared from a vinyl acetate-acrylic copolymer, and is available from Air Products; WAVE 325 which is prepared from a vinyl acetate-acrylic copolymer, and is available from Air Products; NEOCRYL A-630 which is prepared from a styrene-acrylic polymer, and is available from Zeneca; and UCAR 4510 which is prepared from a styrene-acrylic polymer, and available from Union Carbide.

The alkyl 3-alkoxypropionates of the present invention are added to the resin in at least a coalescing amount. By coalescing amount is meant that amount that will facilitate the formation of a continuous film upon drying a coating of the resin under the drying conditions to be employed, preferably under ambient conditions. The coalescing amount will vary according to resin type, formulation, and the specific alkyl 3-alkoxypropionate used. However, in most aqueous coating compositions, a coalescing amount is within the range of about 1 to about 50 parts (dry) by weight of alkyl 3-alkoxypropionate per 100 parts (dry) of resin. Preferably, the level of alkyl 3-alkoxypropionate used is the minimum amount that will effect coalescence, for example, 3 to 25 percent (dry) by weight based on dry weight of the resin.

In the preferred practice of the present invention, the aqueous coating composition contains conventional additives in addition to the resin and coalescing agent. Generally, the additives range from about 100 to about 450 dry parts by weight based on 100 dry parts by weight of resin. Commonly used additives include thickeners, defoamers, surfactants, catalysts, pigments and antimicrobial agents. Generally, these additives are thoroughly blended before their addition to the resin. Selection of the exact additives and the method of blending the additives with the resin will depend upon the end-use application of the coating composition. Neither the additives nor the blending methods are critical to the composition of the present invention. Preferably such additives are added to the resin prior to the combination of the resin with the alkyl 3-alkoxypropionate.

The aqueous coating compositions of the present invention may be easily applied to any surface by conventional means such as a brush or roller and requires no unusual methods of drying to form the desired film. The coatings may be dried under ambient conditions or with the use of forced air drying techniques. Choice of drying conditions will be dictated by the thermoplastic or thermosetting nature of film formation. It is noted that chemical crosslinking of thermosetting systems ordinarily requires elevated temperatures. The aqueous coating compositions are particularly useful in the formulation of architectural and industrial paints.

The testing procedures used for the results shown herein are as follows:

Minimum Film Forming Temperatures (MFFT) was determined according to ASTM Procedure D-2354-68.

The following examples are intended to illustrate, but not limit, the scope of this invention.

EXAMPLES

The following resins were used in the examples:

(A) RHOPLEX AC-390 is a stable dispersion of resin particles prepared from butyl acrylate, 2-ethylhexyl acrylate and methyl methacrylate. RHOPLEX AC-390 has a minimum film forming temperature of 64° F.

(B) RHOPLEX HG-74 is a stable dispersion of resin particles prepared from a styrene-acrylic polymer that contains 15–20% styrene. RHOPLEX HG-74 has a minimum film forming temperature of 86° F.

(C) RHOPLEX WL-91 is a stable dispersion of resin particles prepared from a styrene-acrylic polymer that contains 15–20styrene. RHOPLEX WL-91 has a minimum film forming temperature of 1250° F.

(D) FLEXBOND 325 is a stable dispersion of resin particles prepared from a vinyl acetate-acrylic copolymer. FLEXBOND 325 has a minimum film forming temperature of 970° F.

(E) WAVE 325 is a stable dispersion of resin particles prepared from a vinyl acetate-acrylic copolymer. WAVE 325 has a minimum film forming temperature of 960° F.

(F) NEOCRYL A-630 is a stable dispersion of resin particles prepared from a styrene-acrylic polymer. NEOCRYL A-630 has a minimum film forming temperature of 540° F.

(G) UCAR 4510 is a stable dispersion of resin particles prepared from a styrene-acrylic polymer. UCAR 4510 has a minimum film forming temperature of 610° F.

EXAMPLE 1

In this example, butyl 3-butoxypropionate (BBP) was evaluated as a coalescing aid.

Butyl 3-butoxypropionate was added separately to Resins (A)–(G) at 10 parts per hundred resin (phr). Agitation was applied to the compositions at room temperature and after 24 hours, the initial pH was determined. The compositions were placed in a 120° F. forced-air oven for four weeks to accelerate aging.

Minimum Film Forming Temperature (MFFT) was determined by adding the butyl 3-butoxypropionate separately to Resins (A)–(G) at five different concentration levels based on the solid content of each resin emulsion. The concentration levels were selected so that the minimum film forming temperature values of each composition containing the butyl 3-butoxypropionate was greater than 32° F. with at least one value less than 40° F. The compositions were agitated for at least 72 hours to insure adequate mixing between the resin and butyl 3-butoxypropionate.

Drawdowns having a 6 millimeter thickness for each of the compositions containing the different levels of butyl 3-butoxypropionate were made on an ICI/Sheen Model SS-3000 test instrument which is available from Sheen Instruments. The temperature gradient on the test plate was set at Range 2 which gives a temperature range of 0°–18° C.(32°–64.4° F). Minimum film forming temperature values of less than or equal to 32° F. were not considered to be valid since freezing of the composition inhibits film formation.

The minimum film forming temperature values for each of the compositions containing butyl 3-butoxypropionate was determined after the draw-down films had dried for four hours. The dried films were visually inspected. The minimum film forming temperature was the minimum temperature at which a smooth, crack-free film was obtained after drying.

The Relative Coalescing Efficiency of the coalescing agent which in this example is butyl 3-butoxypropionate compared to the Relative Coalescing Efficiency of 2,2,4-trimethylpentanediol-1,3 monoisobutyrate (TMPIB) was determined by comparing the amount in parts per hundred resin (phr) of the coalescing aid required to lower the minimum film forming temperature of the resin to 40° F. The respective parts per hundred resin values (phr) were determined from the five draw-downs using linear regression analysis.

The Relative Coalescing Efficiency (RCE) was calculated by dividing the phr of TMPIB at 40° F. by the phr of the coalescing aid at 40° F. A Relative Coalescing Efficiency of greater than 1.0 indicates that the coalescing aid is more efficient than TMPIB. A relative coalescing efficiency value of less than 0.92 or greater than 1.08 is significantly different from TMPIB at a 95 percent confidence level.

| Butyl 3-butoxypropionate (BBP) | |
|---|---|
| Pounds/gallon | 7.5 |
| Evaporation Rate (n-butyl acetate = 1.0) | 0.005 |
| Water Miscibility, wt. % @ 20° C. | |
| % solvent in water | 0.1 |
| % water in solvent | 0.6 |
| Hydrolytic Stability | |
| RHOPLEX AC-490 Resin emulsion | |
| pH-Initial | 8.7 |
| pH after 1 week @ 120° F. | 8.6 |
| pH after 2 weeks @ 120° F. | 8.4 |
| pH after 3 weeks @ 120° F. | 8.6 |
| pH after 4 weeks @ 120° F. | 8.6 |

TABLE 1

Minimum Film Forming Temp. of Emulsion/BBP Mixtures

| Emulsion phr | RHOPLEX AC-390 | FLEXBOND 325 | WAVE 345 | NEOCRYL A-630 | UCAR 4510 |
|---|---|---|---|---|---|
| 1 | 47.8° F. | 49.6° F. | 51.1° F. | — | 49.3° F. |
| 2 | 44.2 | 46.8 | 47.5 | 52.8° F. | 41.7 |
| 3 | 38.8 | 41.7 | 42.8 | 40.3 | 36.0 |
| 4 | 36.3 | 37.8 | 38.5 | 36.7 | — |
| 5 | — | 33.8 | 34.5 | 33.4 | — |

TABLE 2

Coalescing Efficiency of BBP compared to TMPIB

| Emulsion | (phr for MFFT 40° F.) | Rel. Coalescing Eff. |
|---|---|---|
| Rhoplex AC-490 | (3.00) | 1.27 |
| Flexbond 325 | (3.45) | 1.16 |
| Wave 345 | (3.70) | 1.32 |
| Neocryl A-630 | (10.50) | 1.60 |
| Ucar 4510 | (8.80) | 1.32 |

The results of Table 2 show that the average relative coalescing efficiency of butyl 3-butoxypropionate was 1.33. Thus, the butyl 3-butoxypropionate was about 33% more efficient as a coalescing aid in emulsions than 2,2,4-trimethylpentanediol-1,3 monoisobutyrate.

EXAMPLE 2

In this example, isobutyl 3-isobutoxypropionate (IBIBP) was evaluated as a coalescing aid.

Isobutyl 3-isobutoxypropionate was added separately to Resins (A)–(G) and the minimum film forming temperature, hydrolytic stability, and relative coalescing efficiency compared to TMPIB was determined by the procedure set forth in Example 1.

| Isobutyl 3-isobutoxypropionate (IBIBP) | |
|---|---|
| Pounds/gallon | 7.5 |
| Evaporation Rate (n-butyl acetate = 1.0) | 0.012 |
| Water Miscibility, wt % @ 20° C. | |
| % solvent in water | <0.1 |
| % water in solvent | 0.5 |
| Hydrolytic Stability | |
| Rhoplex AC-490 Emulsion | |
| pH-Initial | 8.7 |
| pH after 1 week @ 120° F. | 8.6 |
| pH after 2 weeks @ 120° F. | 8.4 |
| pH after 3 weeks @ 120° F. | 8.7 |
| pH after 4 weeks @ 120° F. | 8.7 |

TABLE 3

Minimum Film Forming Temp. of Emulsion/IBIBP Mixtures

| Emulsion phr | RHOPLEX AC-390 | FLEXBOND 325 | WAVE 345 | NEOCRYL A-630 | UCAR 4510 |
|---|---|---|---|---|---|
| 1 | 48.2° F. | 49.6° F. | 53.2° F. | — | — |
| 2 | 45.0 | 47.8 | 50.0 | — | — |
| 3 | 41.0 | 43.9 | 46.0 | — | — |
| 4 | 38.1 | 40.6 | 42.4 | — | — |
| 5 | 34.2 | 37.0 | 38.1 | — | — |
| 6 | — | — | — | — | 56.5° F. |
| 8 | — | — | — | — | 48.6° |
| 10 | — | — | — | 51.1° F. | 40.6 |
| 12 | — | — | — | 40.6 | 32.4 |
| 14 | — | — | — | 32.4 | — |

TABLE 4

Coalescing Efficiency of IBIBP compared to TMPIB

| Emulsion | (phr for MFFT 40° F.) | Rel. Coalescing Eff. |
|---|---|---|
| Rhoplex AC-490 | (3.40) | 1.12 |
| Flexbond 325 | (4.20) | 0.95 |
| Wave 345 | (4.60) | 1.06 |
| Neocryl A-630 | (12.30) | 1.37 |
| Ucar 4510 | (10.20) | 1.14 |
| Rhoplex WL-91 |  | 1.15 |

The results in Table 4 shows that the average relative coalescing efficiency for isobutyl 3-isobutoxypropionate was 1.13. Thus, isobutyl 3-isobutoxypropionate is about 13% more efficient as a coalescing aid in compositions than 2,2,4-trimethylpentanediol-1,3 monoisobutyrate.

EXAMPLE 3

In this example, 2-ethylhexyl 3-ethoxypropionate (EHEP) was evaluated as a coalescing aid.

2-Ethylhexyl 3-ethoxypropionate was added separately to Resins (A)–(G) and the minimum film forming temperature, hydrolytic stability, and relative coalescing efficiency compared to TMPIB was determined by the procedure set forth in Example 1.

| 2-Ethylhexyl 3-ethoxypropionate | |
|---|---|
| Pounds/gallon | 7.6 |
| Evaporation Rate (n-butyl acetate = 1.0) | 0.001 |
| Water Miscibility, wt % @ 20° C. | |
| % solvent in water | 0.1 |
| % water in solvent | 0.5 |
| Hydrolytic Stability | |
| Rhoplex AC-490 Emulsion | |
| pH-Initial | 8.7 |
| pH after 1 week @ 120° F. | 8.6 |
| pH after 2 weeks @ 120° F. | 8.4 |
| pH after 3 weeks @ 120° F. | 8.6 |
| pH after 4 weeks @ 120° F. | 8.6 |

TABLE 5

Minimum Film Forming Temp. of Emulsion/EHEP Mixtures

| Emulsion phr | RHOPLEX AC-390 | FLEXBOND 325 | WAVE 345 | NEOCRYL A-630 | UCAR 4510 |
|---|---|---|---|---|---|
| 1 | 50.0° F. | 48.6° F. | 51.1° F. | — | 53.2° F. |
| 2 | 46.0 | 46.0 | 47.1 | 51.1° F. | 44.6 |
| 3 | 41.0 | 41.7 | 43.5 | 43.9 | 39.2 |
| 4 | 36.0 | 38.1 | 40.6 | 36.0 | — |
| 5 | — | 34.5 | 37.4 | — | — |

TABLE 6

Coalescing Efficiency of EHEP compared to TMPIB

| Emulsion | (phr for MFFT 40° F.) | Rel. Coalescing Eff. |
|---|---|---|
| Rhoplex AC-490 | (3.20) | 1.19 |
| Flexbond 325 | (3.50) | 1.14 |
| Wave 345 | (4.20) | 1.16 |

TABLE 6-continued

Coalescing Efficiency of EHEP compared to TMPIB

| Emulsion | (phr for MFFT 40° F.) | Rel. Coalescing Eff. |
|---|---|---|
| Neocryl A-630 | (11.00) | 1.53 |
| Ucar 4510 | (9.70) | 1.20 |

The results in Table 6 shows that the average relative coalescing efficiency was 1.24. Thus, 2-ethylhexyl 3-ethoxypropionate is about 24% more efficient as a coalescing aid in the compositions than 2,2,4-trimethylpentanediol-1,3 monoisobutyrate.

COMPARITIVE EXAMPLE 4

In this example, 2,2,4-trimethylpentanediol-1,3-monoisobutyrate (TMPIP) was evaluated as a coalescing aid.

2,2,4-Trimethylpentanediol-1,3-monoisobutyrate was added separately to Resins (A)–(G) and the minimum film forming temperature, hydrolytic stability, and relative coalescing efficiency was determined by the procedure set forth in Example 1.

| 2,2,4-trimethylpentanediol-1,3-monoisobutyrate | |
|---|---|
| Pounds/gallon | 7.9 |
| Evaporation Rate (n-butyl acetate = 1.0) | 0.002 |
| Water Miscibility, wt % @ 20° C. | |
| % solvent in water | Insoluble |
| % water in solvent | 0.9 |
| Hydrolytic Stability | |
| Rhoplex AC-490 Emulsion | |
| pH-Initial | 8.8 |
| pH after 1 week @ 120° F. | 8.7 |
| pH after 2 weeks @ 120° F. | 8.5 |
| pH after 3 weeks @ 120° F. | 8.3 |
| pH after 4 weeks @ 120° F. | 8.2 |

TABLE 7

Minimum Film Forming Temp. of Emulsion/TMPIP Mixtures

| Emulsion phr | RHOPLEX AC-390 | FLEXBOND 325 | WAVE 345 | NEOCRYL A-630 | UCAR 4510 |
|---|---|---|---|---|---|
| 1 | 47.0° F. | 47.1° F. | 51.9° F. | — | — |
| 2 | 44.5 | 44.7 | 48.9 | — | — |
| 3 | 42.0 | 42.3 | 45.8 | — | — |
| 4 | 39.5 | 40.0 | 42.7 | — | — |
| 5 | 37.1 | 37.6 | 39.7 | — | — |
| 8 | — | — | — | >65° F. | 51.8° F. |
| 10 | — | — | — | 59.9 | 45.3 |
| 11 | — | — | — | — | 42.0 |
| 12 | — | — | — | 54.2 | 38.8 |
| 14 | — | — | — | 48.3 | 32.3 |
| 15 | — | — | — | 45.5 | — |
| 18 | — | — | — | 36.7 | — |

| Solvent phr | JONCRYL 538 |
|---|---|
| 16.0 | 61.9° F. |
| 18.0 | 50.0 |
| 20.0 | 37.9 |

TABLE 8

Coalescing Efficiency of TMPIB

| Emulsion | (phr for MFFT 40° F.) | Rel. Coalescing Eff. |
|---|---|---|
| Rhoplex AC-490 | (3.81) | 1.00 |
| Flexbond 325 | (3.99) | 1.00 |
| Wave 345 | (4.89) | 1.00 |
| Neocryl A-630 | (16.83) | 1.00 |
| Ucar 4510 | (11.62) | 1.00 |

The results of Comparative Example 4 show that 2,2,4-trimethylpentanediol-1,3-monoisobutyrate is a less efficient coalescing aid than the alkyl 3-alkoxy-propionate in this invention.

COMPARATIVE EXAMPLE 5

In this example, ethyl 3-ethoxypropionate was evaluated as a coalescing aid.

Ethyl 3-ethoxypropionate was added separately to Resins (A)–(G) and the minimum film forming temperature and hydrolytic stability was determined by the procedure set forth in Example 1.

| Butyl 3-ethoxypropionate (EEP) | |
|---|---|
| Pounds/gallon | 7.9 |
| Evaporation Rate (n-butyl acetate = 1.0) | 0.12 |
| Water Miscibility, wt % @ 20° C. | |
| % solvent in water | 2.9 |
| % water in solvent | 2.9 |
| Hydrolytic Stability | |
| Rhoplex AC-490 Emulsion | |
| pH-Initial | 9.7 |
| pH after 1 week @ 120° F. | 8.5 |
| pH after 2 weeks @ 120° F. | 8.2 |
| pH after 3 weeks @ 120° F. | 7.4 |
| pH after 4 weeks @ 120° F. | 7.1 |

Minimum film forming temperature of Emulsion/BBP Mixtures

| Solvent phr | JONCRYL 538 |
|---|---|
| 20.0 | >65° F. |
| 27.5 | >65 |
| 35.0 | >65 |

The results of Comparative Example 5 show that ethyl 3-ethoxypropionate does not have the required hydrolytic stability to be an effective coalescing aid. In addition, ethyl 3-ethoxypropionate is not an effective coalescing aid in JONCRYL 538.

The results in Tables 1–8 show that the aqueous coating compositions of the present invention containing an alkyl 3-alkoxypropionate as the coalescing agent coalesced more easily than corresponding compositions containing other coalescing agents. The results also illustrate that lower levels of the alkyl 3-alkoxypropionate coalescing agents achieve improved film integrity of the final dried coating as compared to using other coalescing agents. Thus, the alkyl 3-alkoxypropionates exhibit greater efficiency as coalescing agents in the aqueous coating compositions of the present invention.

While the invention has been described with particular reference to certain embodiments thereof, it will be understood that changes and modifications may be made which are within the skill of the art. The present invention is limited only by the claims that follow.

What is claimed is:

1. An aqueous coating composition comprising a stable aqueous emulsion or aqueous dispersion of resin particles and a coalescing agent wherein the coalescing agent is an alkyl 3-alkoxypropionate having the structure:

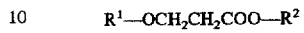

$$R^1\text{—OCH}_2\text{CH}_2\text{COO—}R^2$$

wherein $R^1$ and $R^2$ are independently selected from the group consisting of an alkyl and a arylalkyl group wherein the sum of the carbon atoms of the alkyl and arylalkyl groups is 5 to 10, provided that $R^2$ is not methyl.

2. The aqueous coating composition of claim 1 wherein the alkyl 3-alkoxypropionate is selected from the group consisting of propyl 3-propoxypropionate, butyl 3-ethoxypropionate, isobutyl 3-ethoxypropionate, butyl 3-butoxypropionate, isobutyl 3-isobutoxypropionate, and 2-ethylhexyl 3-ethoxypropionate.

3. The aqueous coating composition of claim 2 wherein the alkyl 3-alkoxypropionate is selected from the group consisting of butyl 3-butoxypropionate, isobutyl 3-isobutoxypropionate, and 2-ethylhexyl 3-ethoxypropionate.

4. The aqueous coating composition of claim 3 wherein the alkyl 3-alkoxypropionate is butyl 3-butoxypropionate.

5. The aqueous coating composition of claim 1 wherein the resin is a stable colloidal dispersion of a thermoplastic or thermosetting organic addition polymer in an aqueous emulsion.

6. The aqueous coating composition of claim 5 wherein the thermoplastic polymer is selected from the group consisting of acrylonitrile-butadiene-styrene, polyvinyl chloride, polyamide, cellulose acetate, acrylic, polystyrene, and combinations thereof.

7. The aqueous coating composition of claim 5 wherein the thermoplastic polymer is selected from the group consisting of a styrene-acrylic polymer and a vinyl acetate-acrylic copolymer.

8. The aqueous coating composition of claim 1 wherein the alkyl 3-alkoxypropionate is added to the resin in a coalescing amount.

9. The aqueous coating composition of claim 8 wherein the alkyl 3-alkoxypropionate is added to the resin in an amount of from about 1 to about 50 parts (dry) by weight of alkyl 3-alkoxypropionate per 100 parts (dry) of resin.

10. The aqueous coating composition of claim 9 wherein the alkyl 3-alkoxypropionate is added to the resin in an amount of from 3 to 25 parts (dry) by weight of alkyl 3-alkoxypropionate per 100 parts (dry) of resin.

11. The composition of claim 1, wherein the resin particle is prepared from an acrylic polymer, a styrene-acrylic polymer or a vinyl acetate-acrylic copolymer.

12. The composition of claim 1, wherein the resin particle is a polymer or copolymer of acrylic acid, methacrylic acid, esters of acrylic acid or methacrylic acid, or acrylonitrile.

13. The composition of claim 12, wherein the ester of acrylic acid or methacrylic acid comprises methyl acrylate, ethyl acrylate, butyl acrylate, hexyl acrylate, isooctyl acrylate, isodecyl acrylate, lauryl acrylate, stearyl acrylate, phenoxyethyl acrylate, methoxyethyl acrylate, benzyl acrylate, furyl acrylate, methylfuryl acrylate, butylfuryl acrylate, tetrahydrofurfuryl acrylate, ethoxyethyl acrylate, 2-ethylhexyl acrylate, cyclopentyl acrylate, cyclohexyl acrylate, isobornyl acrylate, hydroxyethyl acrylate, and hydroxypropyl acrylate, methyl methacrylate, ethyl methacrylate, propyl methacrylate, butyl methacrylate, hexyl methacrylate, cyclohexyl methacrylate, isodocyl methacrylate, lauryl methacrylate, stearyl methacrylate, isobornyl methacrylate, phenyl methacrylate, benzyl methacrylate, propylene glycol methacrylate, tetrahydrofurfuryl methacrylate, hydroxyl-ethyl methacrylate, hydroxypropyl methacrylate or a mixture thereof.

14. The composition of claim 1, wherein the resin particle is a polymer prepared from butyl acrylate, 2-ethylhexyl acrylate and methyl methacrylate.

15. The composition of claim 1, wherein the resin particle is a styrene-acrylic polymer.

16. The composition of claim 1, wherein the resin particle is prepared from a vinyl acetate-acrylic copolymer.

* * * * *